(12) United States Patent
Savage et al.

(10) Patent No.: US 11,357,358 B2
(45) Date of Patent: Jun. 14, 2022

(54) FLUID CONVECTION FRYER

(71) Applicant: PITCO FRIALATOR, INC., Bow, NH (US)

(72) Inventors: Steven Savage, Concord, NH (US); Steven J. Cyr, Londonderry, NH (US); Michael McGinnis, Windham, NH (US); Charles E. Pierce, Boscawen, NH (US); Karl M. Searl, Newmarket, NH (US)

(73) Assignee: PITCO FRIALATOR, INC., Bow, NH (US)

( * ) Notice: Subject to any disclaimer, the term of this patent is extended or adjusted under 35 U.S.C. 154(b) by 350 days.

(21) Appl. No.: 16/392,820

(22) Filed: Apr. 24, 2019

(65) Prior Publication Data
US 2019/0335950 A1 Nov. 7, 2019

Related U.S. Application Data

(60) Provisional application No. 62/667,853, filed on May 7, 2018.

(51) Int. Cl.
*A47J 37/12* (2006.01)

(52) U.S. Cl.
CPC ......... *A47J 37/1223* (2013.01); *A47J 37/129* (2013.01); *A47J 37/1233* (2013.01); *A47J 37/1242* (2013.01)

(58) Field of Classification Search
CPC ............... A47J 37/1223; A47J 37/1233; A47J 37/1242; A47J 37/129
See application file for complete search history.

(56) References Cited

U.S. PATENT DOCUMENTS

| | | | |
|---|---|---|---|
| 5,172,328 A | 12/1992 | Cahlander et al. | |
| 5,809,995 A | 9/1998 | Kobayashi et al. | |
| 2002/0069767 A1 | 6/2002 | Wendel et al. | |
| 2007/0137497 A1* | 6/2007 | Savage | A47J 37/1223 99/403 |
| 2007/0251397 A1* | 11/2007 | Dorsten | A47J 37/1219 99/407 |
| 2010/0212691 A1 | 8/2010 | Hutson et al. | |
| 2013/0098847 A1 | 4/2013 | Lambert et al. | |
| 2017/0095117 A1 | 4/2017 | Savage et al. | |
| 2018/0289216 A1 | 10/2018 | Casey et al. | |

FOREIGN PATENT DOCUMENTS

KR 101437002 B1 9/2014

\* cited by examiner

*Primary Examiner* — Anthony J Weier
(74) *Attorney, Agent, or Firm* — Seyfarth Shaw LLP; Brian Michaelis

(57) ABSTRACT

A substantially closed loop filtration and convection system is configured to move fluid/oil volume within a fryer vat. The vat has a flow directed inlet, which directs flow of cooking fluid in a direction across the bottom of the vat directing the flow of oil and crumbs/debris across the vat, up and across a flow separation portion toward and into a cleaning zone portion of the vat. A crumb tray or crumb/debris catch system is disposed in the cleaning zone adjacent to the vat.

13 Claims, 7 Drawing Sheets

FLUID CONVECTION FRYER

CROSS-REFERENCE TO RELATED APPLICATION DATA

This application claims the benefit of U.S. Provisional Patent Application No. 62/667,853, filed on May 7, 2018, the disclosure of which is incorporated by reference herein.

TECHNICAL FIELD

This specification relates to fryers, and in particular to deep fryers that heat volumes of fluid for cooking, such as cooking oil.

BACKGROUND

In some cooking systems, removable filter pans are used to filter and remove debris and/or other impurities from the cooking fluid, e.g., cooking oil. These removable filter pans, however, may require placement of multiple sensors for different purposes and represent a potential source of issues in a cooking system such as a deep fryer. For example, where a removable filter pan is implemented, a sensor may be used to detect and ensure the removable filter pan is positioned correctly in the deep fryer. Additional fluid sensors are also needed to detect the presence of fluid in these filter pans. Sensors may be negatively impacted by presence of crumbs or debris in the cooking fluid.

Filter pans represent an additional open and at times static, exposed fluid/oil volume in the cooking system, where fluid needs to be moved in and out of, and stored in periodically (along with the fryer vat where frying takes place). Although the intended purpose of the open filter pan is for filtration/cleaning of fluid/oil, the open nature of the filter pan may actually be a source of potential debris getting into the cooking fluid volume.

Generally, it is desirable to remove as much debris as possible from the cooking fluid to ensure proper operation of the fryer. Regular and effective crumb and debris removal also increases the useful life of the cooking fluid (e.g. fryer oil).

SUMMARY OF THE DISCLOSURE

The present disclosure provides a closed-loop fryer fluid circulation or convection configuration that avoids an open filter pan and provides a substantially closed loop filtration and oil convection system. The system is configured to move the fluid/oil volume within the fryer vat, rather than to and from an open filter pan, to effect aspects of filtration of the cooking fluid.

The fryer configuration according to the disclosure has an open fluid component that, in one embodiment, may involve a reduced oil volume (ROV) deep drawn cooking vat with minimized unswept volumes facilitated by elimination of sharp corners within the fryer vat. Corners of the vat are rounded to avoid crumbs and debris settling into and sticking in sharp corners of the fryer cooking vat (sometimes referred to as a "frypot").

The deep drawn cooking vat, which does not house burners or heating elements within the vat, is comprised of a cooking portion and an adjacent cleaning zone. A gap or "weir" on a flow separator portion is disposed between the cooking portion and adjacent cleaning zone. The closed loop system is configured to direct a flow of cooking fluid or oil from the cooking portion of the vat across the flow separator portion and through or over one or more weirs into the cleaning zone portion (it should be appreciated that the terms "cooking fluid" or "oil" may be used interchangeably throughout this disclosure). The flow separator portion, with weir disposed at an upper portion thereof, may be implemented as an angled wall with an upward tilt from a bottom portion of the cooking portion of the vat toward the cleaning portion. The weir may be a gap or gaps (or low portion(s)) in an upper portion of the angled wall of the flow separator portion between the cooking portion and the cleaning zone.

According to an aspect of the disclosure, cooking fluid is introduced into the vat at one or more inlets at a wall or walls of the vat distal to the weir portion. The inlet(s), which may be in the form of a flow jet or nozzle, may be configured to direct the flow of oil in a downward and/or forward direction (away from the position of the jets), across the bottom and/or sides of the vat from the distal wall of the cooking portion of the vat toward the weir and cleaning zone portion of the vat. In the reduced oil volume (ROV) deep drawn cooking vat embodiment with minimized unswept volumes (resulting from rounded interior surfaces), the directed, e.g., downward, flow of cooking oil, results in a substantial amount of any crumbs and food debris (which tends to gravitate toward the bottom of the vat) being picked up and moved with the flow of oil. The directed flow of the cooking oil will sweep crumbs or other particles away from the distal wall toward and up the angled wall of the flow separator portion, through the weir and into the cleaning zone portion of the vat.

The cleaning zone portion of the vat may include a crumb tray or trap or other filter mechanisms to catch the food debris. The food debris may be periodically automatically or manually eliminated from the system. In an embodiment, an automated crumb tray or filter basket may be implemented in the cleaning zone to periodically eliminate crumbs and food debris that has been swept into the cleaning zone from the cooking vat.

In a closed-loop oil flow configuration and method according to the disclosure, a deep drawn tank or vat with minimized unswept volumes is provided. Cooking fluid, e.g. oil, that has been pumped into a burner and heat exchange heating assembly is introduced into the vat at one or more inlets at an end wall of the vat. The inlet(s), which may be in the form of a flow jet, direct the flow of oil in a direction across the bottom of and along the vat directing the flow of oil and crumbs/debris across the vat toward the cleaning zone portion of the vat. A substantial amount of any crumbs and food debris is picked up and moved with the flow of oil. The flow of the cooking oil will sweep crumbs or other particles toward and up the angled wall of a flow separator wall as the crumbs/debris are subjected to convection currents. As the crumbs/debris move up the flow separator wall, they flow into the cleaning zone portion of the vat and are substantially maintained in the cleaning zone portion by the weir and continued flow/convection of oil.

The cleaning zone portion of the vat may include a crumb tray, crumb conveyor or trap or other filter mechanisms to catch the food debris. The crumb tray may be used to manually or automatically, periodically, remove crumbs/debris from the cooking oil and system. The sweeping of the oil across the vat as the oil flow directs crumbs/debris toward the cleaning zone creates convection currents within the oil that facilitate greater uniformity of heating of the oil in the vat, reducing temperature gradients, and enhances the cooking properties of the vat and fluid convection system according to the disclosure.

The foregoing and other advantages of the present disclosure will become more apparent to those skilled in the art from the following description of detailed embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION

Figure 1:
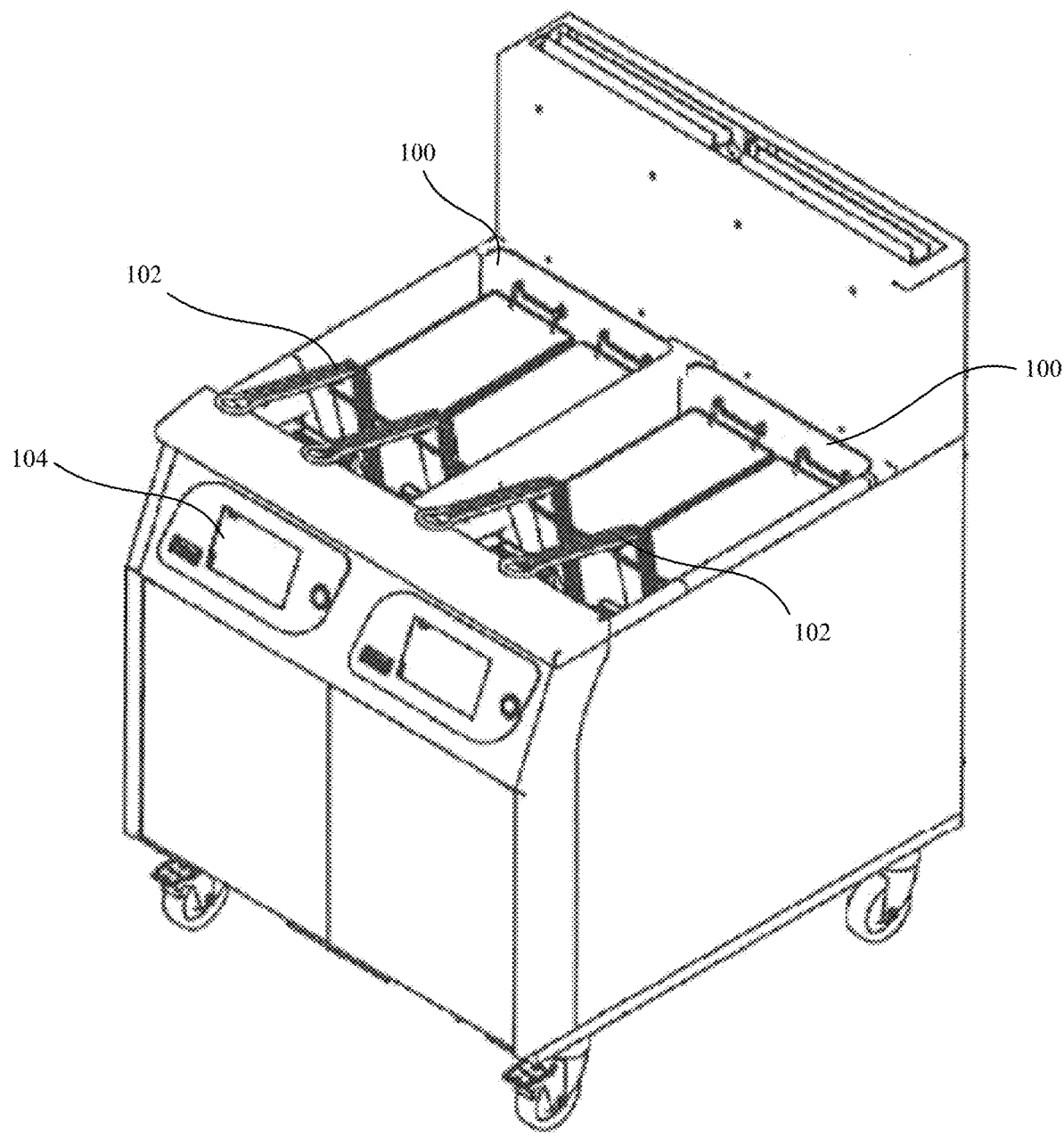
FIG. 1 is a perspective view of a fryer for implementing aspects of the disclosure.
Figure 2A:
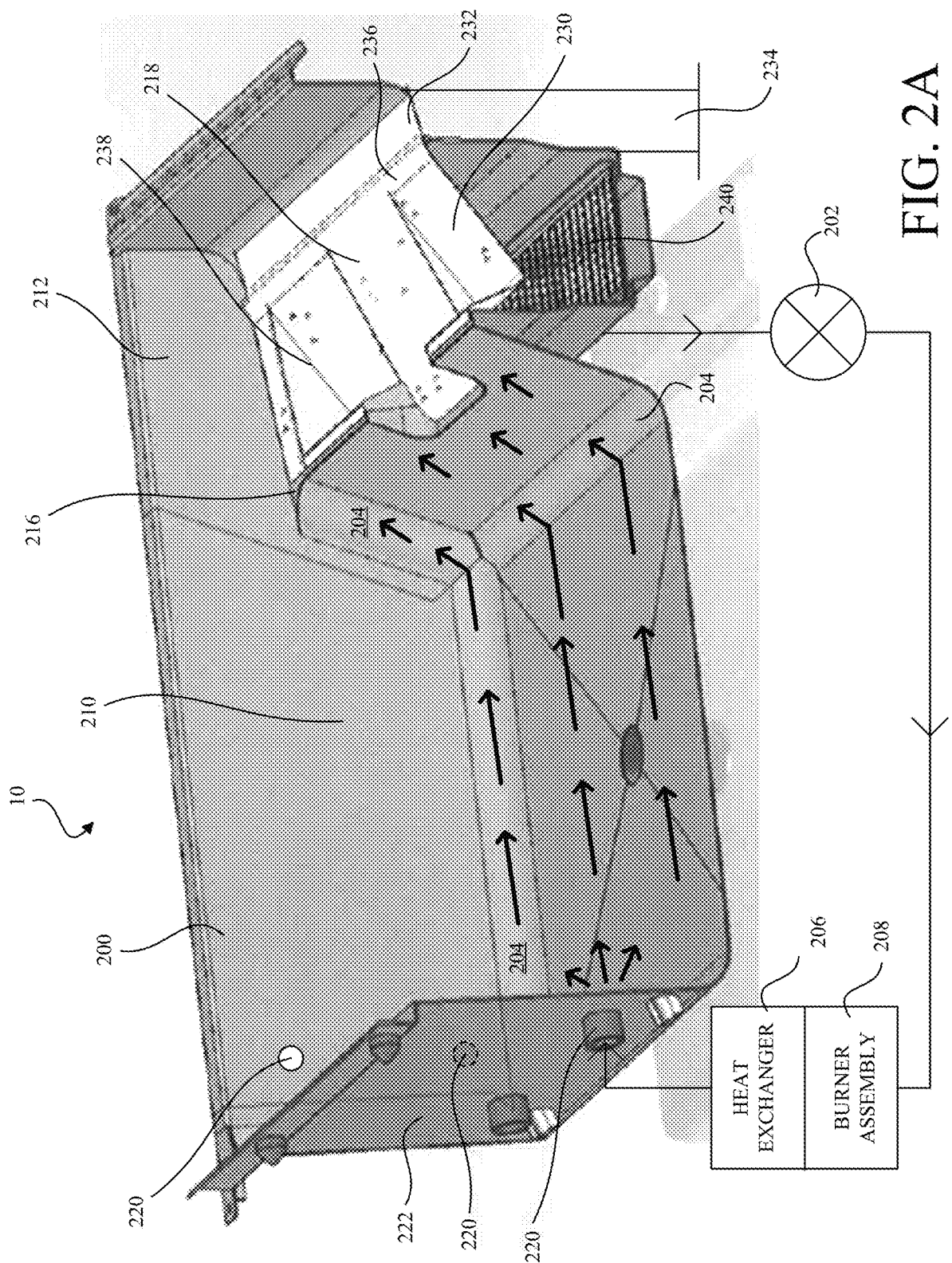
FIG. 2A is a perspective and schematic view of a fryer closed-loop oil flow configuration, showing a deep drawn tank with minimized unswept volumes according to an aspect of the disclosure, partially in section.
Figure 2B:
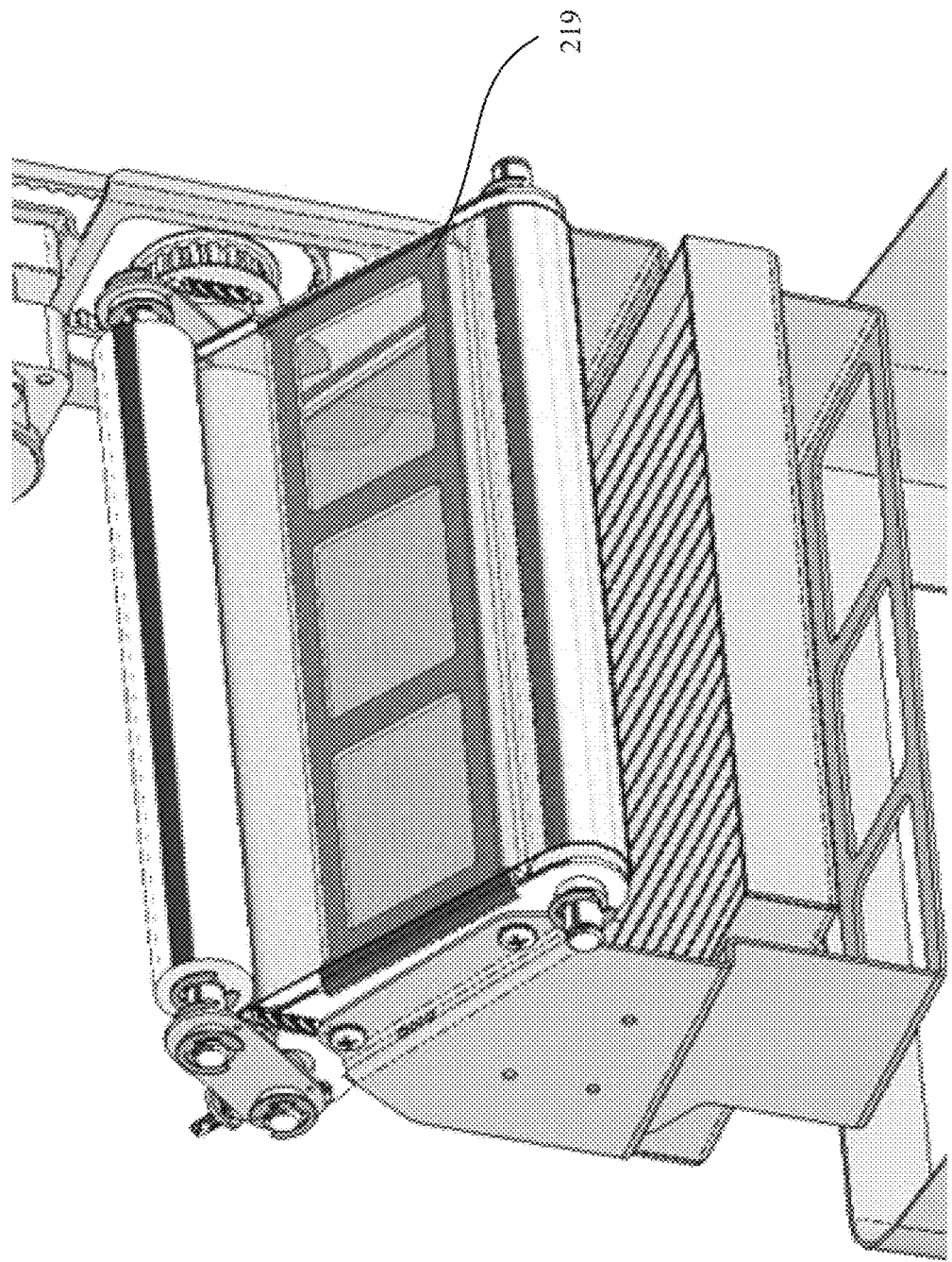
FIG. 2B is a perspective view of an alternative crumb catch mechanism in the form of a crumb catch conveyor.
Figure 3:
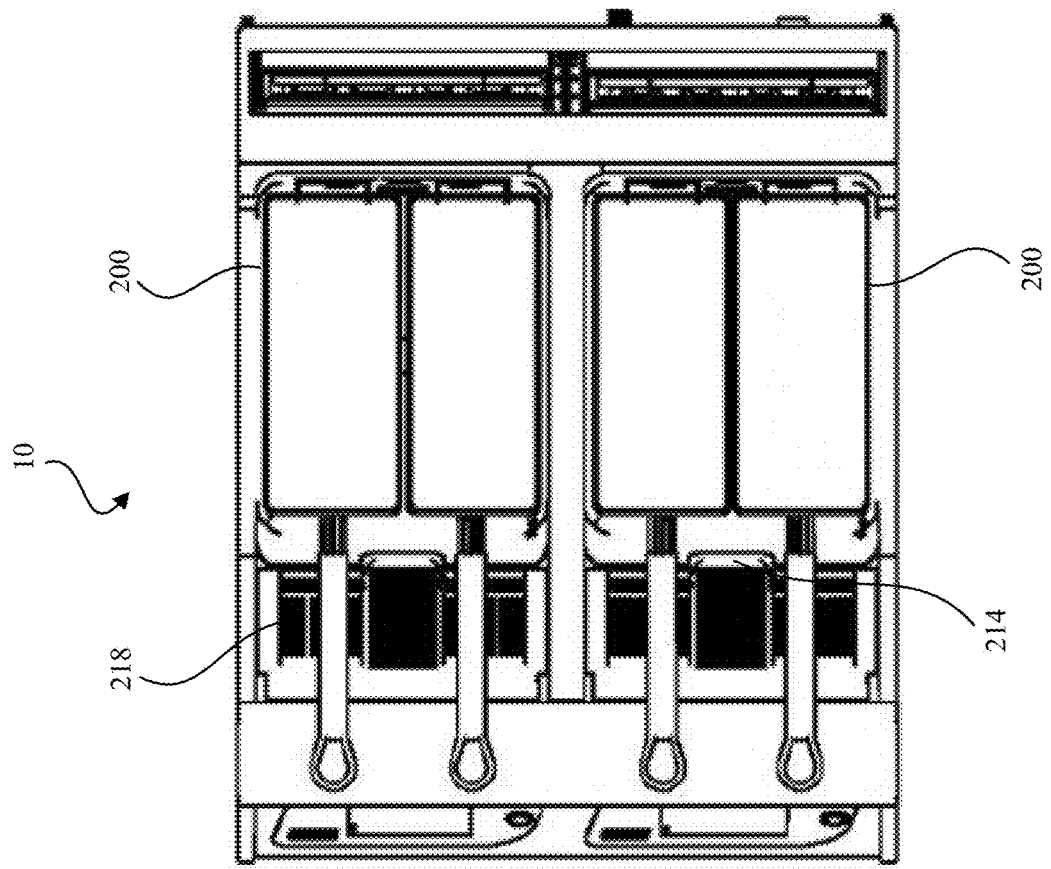
FIG. 3 is a top down view of a fryer according to the disclosure.
Figure 4:
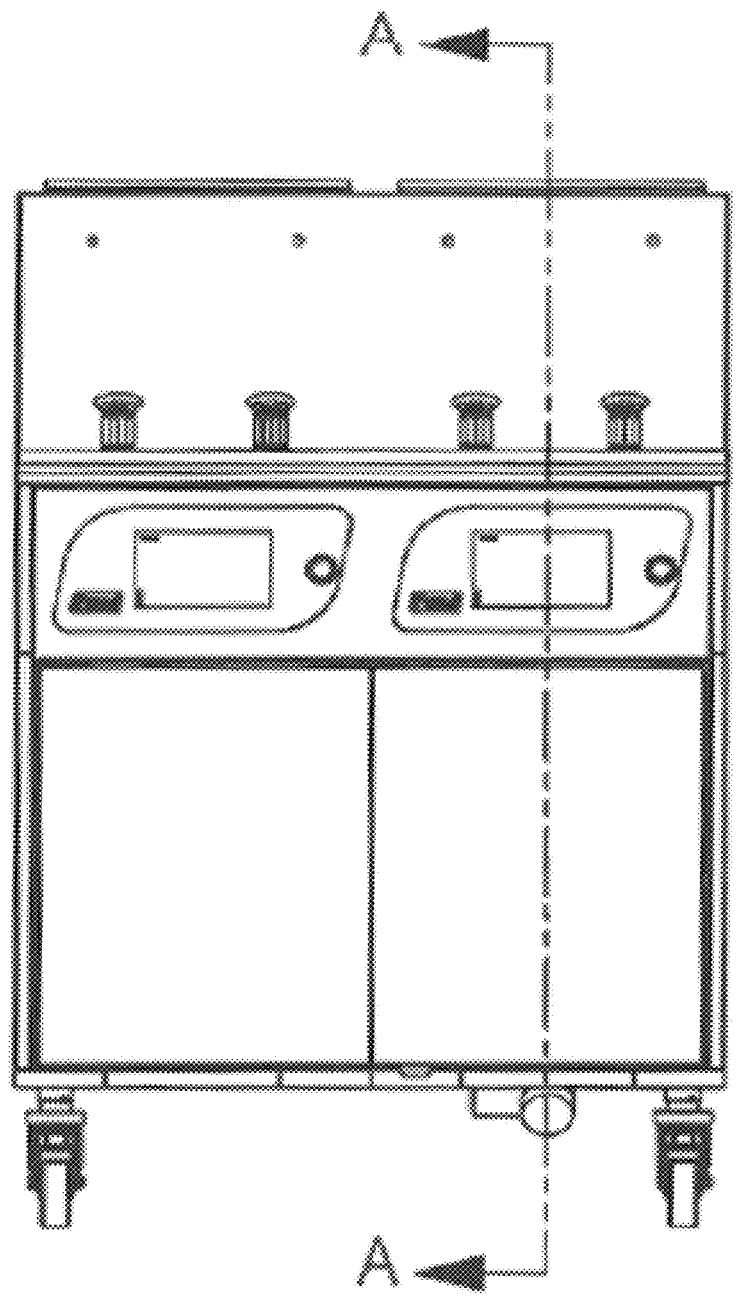
FIG. 4. is a front view of a fryer according to the disclosure, showing a Section line A-A.

FIG. 1 illustrates a deep fryer 10, which could be a reduced oil volume (ROV) fryer, that includes at least one fryer vat 100, configured to receive fryer baskets 102, for frying food that may be disposed in the fryer baskets 102. Two fryer vats 100 are illustrated in FIG. 1, each having two fryer baskets 102 such that four fryer baskets are shown, however, it should be appreciated that other configurations and number of baskets may be implemented in a system according to the disclosure. The deep fryer 10 may also have electrical/electronic control components 104 disposed on a front side of the deep fryer 10. Each fryer vat 100 has corresponding electrical/electronic control so that each fryer vat may be separately controlled, e.g., for frying different foods according to different parameters. The fryer vat(s) can be used to efficiently heat and maintain a temperature of a cooking oil that is contained within the vat (also known as a "frypot") of the deep fryer 10.

As illustrated in FIGS. 2 through 5, the deep fryer 10 configuration according to the disclosure provides a closed-loop fryer fluid circulation or convection configuration that may eliminate the need for an open filter pan, and provides a substantially closed loop filtration and convection system. The system generally may include a deep drawn cooking vat 200, e.g., a reduced oil volume (ROV) vat. A pump 202 moves cooking fluid, e.g., oil, through the system. The suction side of the pump 202 pulls cooking oil from a portion of the cooking vat 200 and pumps it into a heat exchanger 206 that provides efficient heating of the oil in conjunction with a burner assembly 208. An illustrative heat exchanger/burner configuration may be one as disclosed in U.S. Provisional Patent Application No. 62/667,835, Filed: May 7, 2018, titled REDUCED OIL VOLUME DEEP FRYER BURNER SYSTEM, which is incorporated herein by reference in its entirety.

Rather than having an open filtration pan and an open fryer vat, the system's open fluid component is the deep drawn cooking vat 200 (e.g., the reduced oil volume (ROV vat), in the system illustrated in FIGS. 1, 3, 4 and 5 two cooking vats 200 are shown). Each cooking vat 200 (best illustrated in FIG. 2), is fabricated with minimized unswept volumes facilitated by elimination of sharp corners within the fryer vat. The vat 200, according to the disclosure, may be stamped from stainless steel, sheet metal, or welded, to have interior corners 204 of the vat 200 that are rounded to avoid crumbs and debris settling into and sticking in sharp corners of the fryer cooking vat.

The deep drawn cooking vat, which does not house burners or heating elements within the vat, is comprised of a cooking portion 210 and an adjacent cleaning zone 212. A weir or gap 214 on a flow separator portion 216 is disposed between the cooking portion and adjacent cleaning zone. Although illustrated as a unitary structure, it should be appreciated that the cooking portion 210 and adjacent cleaning zone 212 could be configured as a plurality of structures, for example two tanks or vats side-by-side, with adjacent walls forming the flow separator portion 216 disposed therebetween. The closed loop oil flow system according to the disclosure is configured to direct a flow of cooking fluid or oil (represented by arrows in FIG. 2) from the cooking portion 210 of the vat, across the flow separator portion 216 through the weir 214, and into the cleaning zone 212. The flow separator portion 216 may be implemented as an angled wall with an upward tilt from a bottom portion of the cooking portion of the vat toward the cleaning portion. The weir 214 may be a gap or gaps in an upper portion or a relatively low section of the angled wall of the flow separator portion 216 between the cooking portion 210 and the cleaning zone 212.

According to an aspect of the disclosure, cooking fluid is introduced into the vat at one or more inlets 220 at a steep wall 222 of the vat distal to the weir 214 and flow separator portion 216. The inlet(s) 220, which may be integrated in the back wall and/or side walls distal to the flow separator portion 216, may be in the form of a flow jet or directed nozzle. The flow jet(s) or nozzle(s) may be configured to direct the flow of oil in a downward direction across the bottom of the vat 200 from the steep distal wall 222 of the cooking portion 210 of the vat 200 toward the weir 214 and cleaning zone 212 of the vat 200. One or more of the inlets 220 may direct flow other than downwardly to assist in directing flow and sweeping debris in the oil toward the cleaning portion 212 of the system. The directed flow of cooking oil, e.g., into the reduced oil volume deep drawn cooking vat with minimized unswept volumes (resulting from rounded interior surfaces), results in a substantial amount of any crumbs and food debris (which tends to gravitate toward the bottom of the vat) being picked up and moved with the flow of oil (again, represented as the arrows in FIG. 2). A downward orientation of the directed flow of the cooking oil will sweep crumbs or other particles away from the steep distal wall 222 toward and up the angled wall of the flow separator portion 216, through the weir 214 and into the cleaning zone 212 portion of the vat 200.

The cleaning zone 212 of the vat 200 may include a crumb tray 218 or trap or other filter mechanisms to catch the food debris. The food debris may be periodically automatically or manually eliminated from the system. In an embodiment, an automated crumb tray 218 may be implemented in the cleaning zone 212 to periodically eliminate crumbs and food debris that has been swept into the cleaning zone 212 from the cooking vat 200. In one embodiment, a crumb tray is configured as disclosed in U.S. Provisional Patent Application No. 62/666,971, Filed: May 4, 2018, titled AUTOMATED FRYER CRUMB CATCH, which is incorporated herein by reference, in its entirety. Alternatively, a crumb or debris conveyor may be configured as disclosed in U.S. Provisional Patent Application No. 62/740,680, Filed: Oct. 3, 2018, titled Automated Fryer Crumb Catch Conveyor, which is incorporated herein by reference, in its entirety.

The crumb tray 218, in one embodiment, is disposed at an upper portion of the oil cleaning zone 212, and is comprised of a first portion 230 that is slotted, mesh or otherwise perforated screen to facilitate catching crumbs/debris from the oil. A second part 232 of the crumb tray 218 is substantially imperforate and is disposed over a chute. The chute 234 is a disposal chute into which the crumbs fall, or may be driven down. The crumb tray 218 is configured on a pivot 236 to pivot between an open and a closed position and may be actuated to dispose crumbs/debris filtered from the oil down the disposal chute 234.

In the closed position the crumb tray 218 perforated portion 230 catches crumbs/debris 238 from the oil, and the second part 232 of the crumb tray 218 is substantially imperforate and acts as a closure disposed over the disposal chute 234. In the open position, the first and second portions are tilted downward into the chute to dispose of crumbs that have collected on the crumb tray. In an embodiment, a secondary filter media tray 240, such as a removable filter medium, may be disposed at a bottom portion of the cleaning zone 212 beneath the automated crumb tray 218.

Alternatively, a crumb filter may be implemented at an upper portion of the oil cleaning zone, and is comprised of a small conveyor 219 with a belt that is made of a filtering mesh that allows the cooking oil to pass through, to facilitate catching crumbs/debris from the oil. The crumbs and debris will travel on the conveyor belt to the discharge end where the crumbs will be expelled into a disposal chute. The chute will deposit the crumbs into a holding pan.

Figure 5:
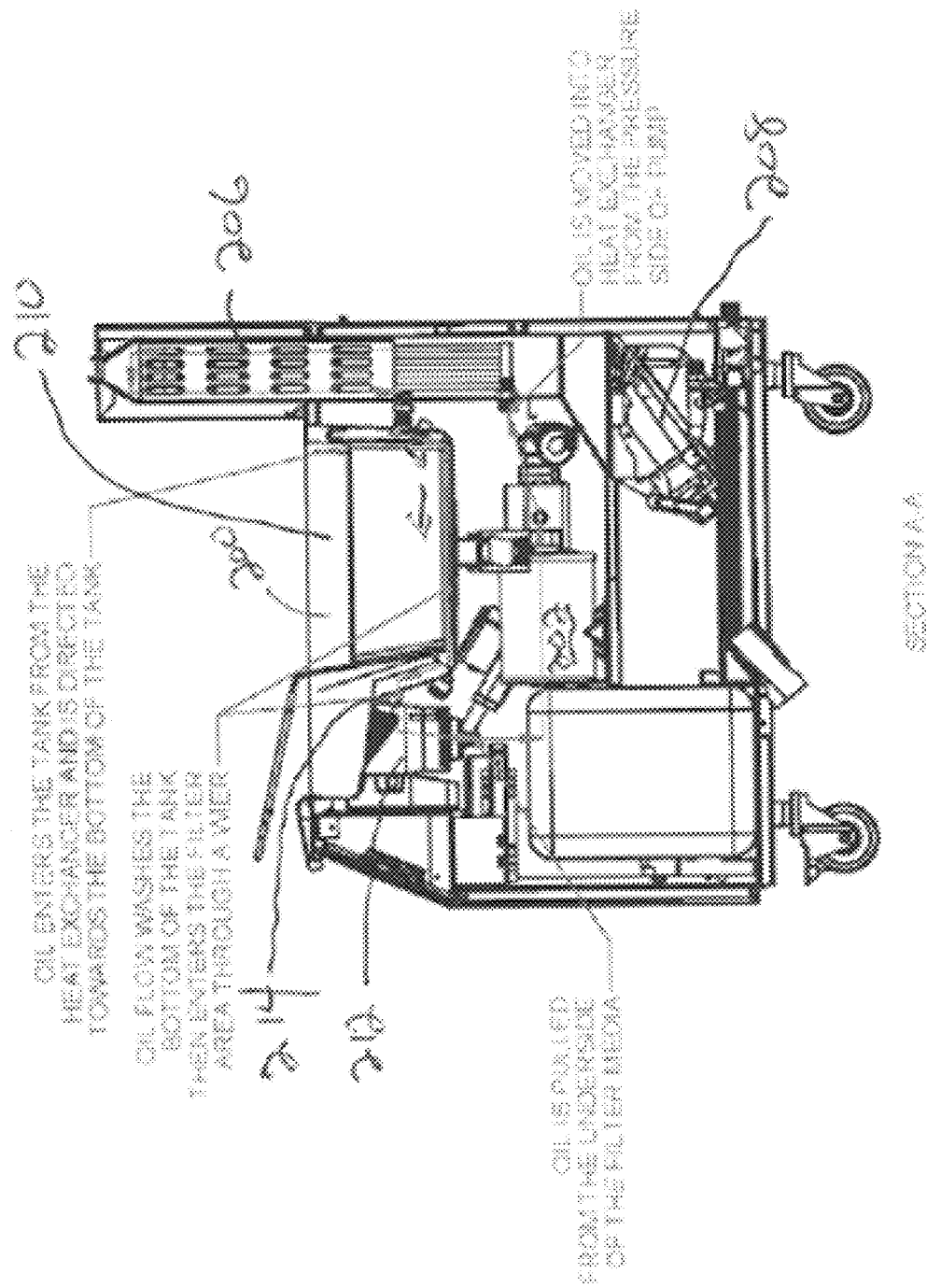
FIG. 5. is a sectioned view, taken along line A-A of FIG. 4, of a fryer according to the disclosure.

In the closed-loop oil flow system, as described, and illustrated in FIG. 5, the suction side of the pump 202 pulls cooking oil from a portion of the cooking vat 200 and pumps it into a heat exchanger 206 that provides efficient heating of the oil in conjunction with a burner assembly 208. Heated oil from the burner and heat exchanger is directed into the vat 200, and along the bottom and/or sides of the vat 200 by the by a plurality of inlet(s) 220 (e.g., flow jets or directed nozzles) integrated in the back wall and/or side walls distal to the flow separator portion 216. The flow of oil is directed across the vat 200 toward the weir 214 and cleaning zone 212 of the vat 200. In the cleaning zone 212 the oil is filtered by one or more of a crumb catch mechanism and filter media, and the oil is pulled from the cleaning zone 212, e.g., at the underside of the cleaning zone beneath filter media at the suction side of the pump 202. The filtered oil in the convection fluid system is then pumped back into the burner and heat exchanger assembly for efficient heating and is directed back into the vat 200. The closed loop system as described results in efficient heating and cleaning of the oil in the deep fryer system and provides more uniform and efficient cooking of food by the heated oil as it is more uniformly heated and circulated within the system.

Figure 6:
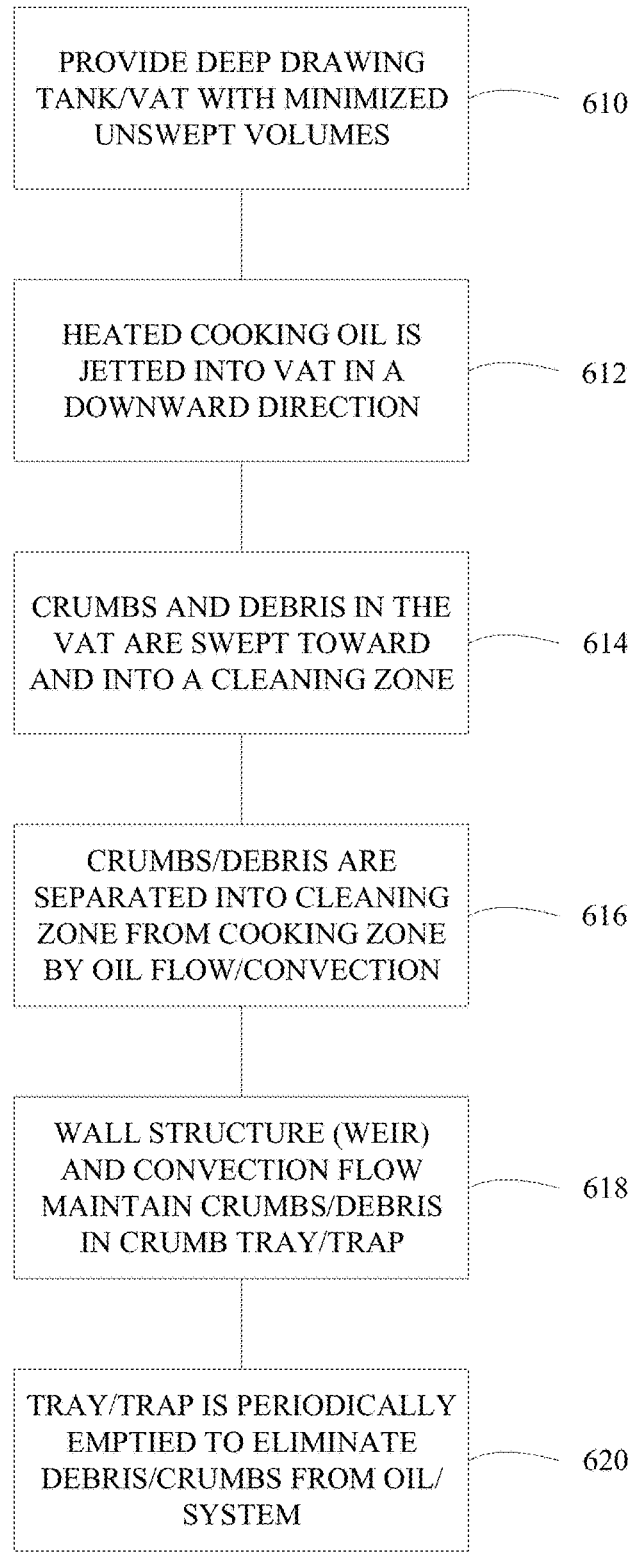
FIG. 6 is a flow diagram of a method implementing oil flow and convection for removing crumbs/debris from cooking oil in a system according to the disclosure.

In a method implementing closed-loop oil flow according to the disclosure, as illustrated in FIG. 6, a deep drawn tank or vat with minimized unswept volumes is provided, depicted as box 610. Cooking fluid, e.g. oil, that has been pumped into a burner and heat exchange heating assembly, is introduced into the vat at one or more inlets at an end of the cooking vat distal to a flow separator portion and cleaning zone portion of the of the system. Oil is directed away from the distal wall of the vat in a downward direction, box 612. The inlet(s), which may be in the form of a flow jet, nozzle or directed nozzle, direct the flow of oil in the downward direction across the bottom of the vat directing the flow of oil and crumbs/debris across the vat toward and into a cleaning zone of the vat, box 614. A substantial amount of any crumbs and food debris is picked up and moved with the flow of oil. The flow of the cooking oil will sweep crumbs or other particles away from the end wall where the oil is jetted from, toward and up the angled wall of a flow separator wall as the crumbs/debris are subjected to convection currents, box 616. As the crumbs/debris move up the flow separator wall, they flow into a cleaning zone portion of the vat, e.g., through a weir, and are substantially maintained in the cleaning portion by the weir and continued flow/convection of oil, box 618. The cleaning zone portion of the vat may include a crumb catch in the form of a crumb tray, conveyor or trap or other filter mechanisms to catch the food debris. The crumb catch may be used to manually or automatically, periodically, remove crumbs/debris from the cooking oil and system, box 620. The sweeping of the oil across the vat, as the oil flow directs crumbs/debris toward the cleaning zone, creates convection currents within the oil that facilitate greater uniformity of heating of the oil in the vat, and enhances the cooking properties of the vat and convection system according to the disclosure.

Although a deep drawn vat configuration is described herein comprising a cooking portion and a cleaning zone, it should be appreciated that the two zones may be configured in a single, integrated vat construction, such as may be stamped and/or welded into a unitary structure, with the separating weir portion as a part of that unitary structure. Similarly, it should be appreciated that the same structure could be implemented by attaching the multiple components, as separate components, into an integrated structure without departing from the disclosure.

While a deep drawn fryer vat is described herein, having rounded corners and flow angles that facilitate minimized unswept volumes within the tank, it should be appreciated that alternative tank embodiments may be implemented with different geometric aspects that still result in a flow of fluid from a first portion of the tank to a second portion of the tank.

Although a gap or "weir" on a flow separator portion disposed between the cooking portion and adjacent cleaning zone is described and illustrated herein as a single gap at the top portion of the flow separator portion, it should be appreciated that more than a single gap or weir could be implemented (for example, 2, 3, 4 or more), and the gaps/weirs could be implemented below the top of the flow separator portion as well as at the top, as well as combinations thereof (e.g. some at the top and some below the top). Furthermore, the weir itself could be a wall portion that is lower than other walls of the vat.

In some embodiments, a controller may be programmed to provide an error message to the user (by way of a message board, digital readout, warning light, audible signal, or the like when the crumb tray and/or disposal pan are filled with a quantity of crumbs/debris that necessitates removal. Sensors, e.g., optical sensor(s) may be implemented for crumb detection. The error message may prompt the user to investigate the cause of excess collection of crumbs, and to take steps to cure the same, e.g. mechanically cleaning the crumb tray and/or disposal pan to try to clear the error message.

Although illustrative control processing as described in embodiments herein may be implemented by microcontroller in program code, it should be appreciated by those skilled in the art that discrete control electronics, large scale integrated circuitry or other control technologies may be used to implement the functionality described herein.

While various embodiments are disclosed herein, it should be understood that the disclosure is not so limited and modifications may be made without departing from the disclosure. The scope of the disclosure is defined by the appended claims, and all devices that come within the meaning of the claims, either literally or by equivalence, are intended to be embraced therein.

What is claimed is:

1. A deep fryer system, comprising:
a cooking vat including a cooking portion, and a cleaning zone portion;
a flow separation portion disposed within the cooking vat, substantially separating the cooking portion and the cleaning zone portion of the cooking vat, the flow separation portion having a gap at a top portion thereof to permit cooking fluid to flow between the gap from the cooking portion of the cooking vat to the cleaning zone portion of the cooking vat, the flow separation portion having an angled wall extending upwardly at an angle from a lower part of the cooking portion of the cooking vat toward the gap at the top portion of the cleaning zone portion of the cooking vat;
an inlet disposed in a distal wall of the cooking portion of the cooking vat, distal from the flow separation portion, the inlet introducing cooking fluid into the cooking vat and directing a flow of cooking fluid in a downward direction into the cooking portion of the cooking vat to direct the flow of cooking fluid away from the distal wall of the cooking portion toward the lower part of the cooking portion and up the angled wall toward the gap and into the cleaning zone portion of the cooking vat; and
a cleaning tray disposed in the cleaning zone portion of the cooking vat, the cleaning tray having a perforated portion receiving the flow of cooking fluid and filtering debris from a volume of the flow of cooking fluid passing over the cleaning tray.

2. The deep fryer system of claim 1 wherein the flow separation portion disposed within the cooking vat substantially separating the cooking portion and the cleaning zone portion of the cooking vat is an integral portion of a unitary cooking vat comprising the cooking portion and the cleaning zone portion of the cooking vat with the flow separation portion disposed between the cooking portion and the cleaning zone portion of the cooking vat.

3. The deep fryer system of claim 1 wherein the cleaning tray disposed in the cleaning zone portion further comprises a pivot holding the cleaning tray in position for actuation between a first position and a second position; and the deep fryer system further comprises an actuator actuating the cleaning tray, relative to the pivot, between the first position and the second position.

4. The deep fryer system of claim 1 wherein the cooking vat has rounded interior corners.

5. A cooking system, comprising:
a cooking vat including a cooking portion, and a cleaning zone portion in a unitary construction;
a flow separation portion disposed within the cooking vat, substantially separating the cooking portion and the cleaning zone portion of the cooking vat, the flow separation portion having an angled wall extending upwardly from a lower part of the cooking portion of the cooking vat toward a gap at the top portion of the cleaning zone portion of the cooking vat;
an inlet disposed in a distal wall of the cooking portion of the cooking vat, distal from the flow separation portion, the inlet introducing a flow of cooking fluid into the cooking vat, and directing the flow of cooking fluid from the distal wall of the cooking portion of the cooking vat to the lower part of the cooking portion of the cooking vat and up the angled wall toward and into the cleaning zone portion of the cooking vat; and
a cleaning mechanism disposed in the cleaning zone portion of the cooking vat, the cleaning mechanism receiving the flow of cooking fluid and filtering debris from a volume of the flow of cooking fluid passing over the cleaning mechanism.

6. The cooking system of claim 5 wherein the system is a deep fryer and the cooking fluid is cooking oil.

7. The cooking system of claim 5 wherein, the inlet directs the flow of cooking fluid in a downward direction into the cooking vat.

8. The cooking system of claim 5 wherein, the inlet comprises at least one inlet along a back wall and along a side will distal from the cleaning zone portion of the vat.

9. The cooking system of claim 5 wherein, the inlet comprises one of a flow jet or a nozzle.

10. The cooking system of claim 5 wherein, the cleaning mechanism includes a cleaning tray having a perforated portion receiving the flow of cooking fluid and filtering debris from the volume of the flow of cooking fluid passing over the cleaning tray.

11. The cooking system of claim 5 wherein, the cleaning mechanism includes a cleaning conveyor receiving the flow of cooking fluid and conveying filtered debris from the volume of the flow of cooking fluid into a debris disposal mechanism.

12. The deep fryer system of claim 1 wherein the inlet is further configured to direct the flow of cooking fluid along a bottom of the cooking portion of the cooking vat before flowing up the angled wall.

13. The deep fryer system of claim 1 wherein the angled wall has an upward tilt from a bottom portion of the cooking portion of the cooking vat away from the distal wall and towards the cleaning zone portion of the cooking vat.

* * * * *